US008825500B2

(12) United States Patent
DeBartolo, III et al.

(10) Patent No.: US 8,825,500 B2
(45) Date of Patent: Sep. 2, 2014

(54) SOLAR ENERGY COLLECTING SYSTEMS AND METHODS

(75) Inventors: Jack DeBartolo, III, Phoenix, AZ (US); Robert L. Boscamp, Tempe, AZ (US); Thomas Headley, Scottsdale, AZ (US)

(73) Assignee: Strategic Solar Energy, LLC, Scottsdale, AZ (US)

(*) Notice: Subject to any disclaimer, the term of this patent is extended or adjusted under 35 U.S.C. 154(b) by 267 days.

(21) Appl. No.: 13/185,190

(22) Filed: Jul. 18, 2011

(65) Prior Publication Data
US 2012/0016815 A1 Jan. 19, 2012

Related U.S. Application Data

(60) Provisional application No. 61/399,728, filed on Jul. 16, 2010.

(51) Int. Cl.
| | | |
|---|---|---|
| *G06Q 10/00* | (2012.01) | |
| *G06Q 99/00* | (2006.01) | |
| *H01L 31/048* | (2014.01) | |
| *G06Q 30/00* | (2012.01) | |
| *E04H 6/02* | (2006.01) | |

(52) U.S. Cl.
CPC ............... *G06Q 30/00* (2013.01); *Y02B 10/20* (2013.01); *Y02B 10/12* (2013.01); *G06Q 99/00* (2013.01); *H01L 31/0482* (2013.01); *Y02E 10/50* (2013.01); *E04H 6/025* (2013.01); *Y10S 136/291* (2013.01)
USPC ........... 705/1.1; 52/173.3; 136/244; 136/251; 136/291; 257/433; 126/621; 126/622; 126/623

(58) Field of Classification Search
USPC ........... 705/1.1; 52/173.3; 136/244, 251, 291; 257/433; 126/621, 622, 623
See application file for complete search history.

(56) References Cited

U.S. PATENT DOCUMENTS

| | | | | |
|---|---|---|---|---|
| 5,125,608 | A * | 6/1992 | McMaster et al. | 248/163.1 |
| 5,212,916 | A * | 5/1993 | Dippel et al. | 52/82 |
| 5,478,407 | A * | 12/1995 | Dorison et al. | 136/244 |
| 6,378,810 | B1 * | 4/2002 | Pham et al. | 244/158.5 |
| 6,930,237 | B2 * | 8/2005 | Mattiuzzo | 136/251 |
| 7,531,741 | B1 * | 5/2009 | Melton et al. | 136/246 |
| 8,294,022 | B2 * | 10/2012 | Lenox | 136/246 |
| 8,464,496 | B2 * | 6/2013 | Cusson et al. | 52/745.06 |
| 2004/0025931 | A1 * | 2/2004 | Aguglia | 136/246 |
| 2004/0065025 | A1 * | 4/2004 | Durham | 52/73 |
| 2005/0035244 | A1 * | 2/2005 | Conger | 248/49 |
| 2005/0109384 | A1 * | 5/2005 | Shingleton et al. | 136/244 |
| 2006/0090788 | A1 * | 5/2006 | Oak | 136/244 |
| 2008/0257402 | A1 * | 10/2008 | Kamp et al. | 136/251 |
| 2009/0050194 | A1 * | 2/2009 | Noble et al. | 136/251 |
| 2010/0000596 | A1 * | 1/2010 | Mackler | 136/246 |
| 2010/0043781 | A1 * | 2/2010 | Jones et al. | 126/704 |
| 2010/0193013 | A1 * | 8/2010 | Kong | 136/251 |
| 2012/0181973 | A1 * | 7/2012 | Lyden | 320/101 |

* cited by examiner

*Primary Examiner* — Carrie Gilkey
(74) *Attorney, Agent, or Firm* — Snell & Wilmer L.L.P.

(57) ABSTRACT

In accordance with various exemplary embodiments, solar energy shade structures and methods of design and revenue generation are disclosed. These systems comprise structures capable of supporting solar panel at heights greater than 18 feet above their mounting surface. These systems may be installed in confined spaces. These systems also comprise structures that are customizable, allowing an installation to be configured with a desired lighting and environmental effect. The methods discussed herein describe processes for achieving desired design effects based on natural elements. Moreover, the methods discussed herein describe processes for reducing the costs of generating solar energy and/or reducing the costs of providing a solar structure.

22 Claims, 11 Drawing Sheets

SOLAR ENERGY COLLECTING SYSTEMS AND METHODS

CROSS-REFERENCE TO RELATED APPLICATIONS

This application claims priority to U.S. Provisional Application No. 61/399,728, filed Jul. 16, 2010, entitled "Solar energy collecting shade structure," which is herein incorporated by reference in its entirety.

FIELD OF INVENTION

The present disclosure generally relates to apparatus, systems and methods for collecting solar energy and relates more specifically to providing shade and collecting solar energy.

BACKGROUND OF THE INVENTION

There is an unsolved need to collect large amounts of solar energy without causing a large negative impact to the local environment where the energy is collected. Some current solar energy collection technologies collect energy for personal use by mounting photovoltaic solar panels on the rooftops of homes or other buildings. These technologies are fine for personal use but they are restricted to collecting relatively small amounts of energy (50 kilowatts or less). Other current solar energy collection technologies collect large amounts of solar energy (one megawatt to several hundred megawatts) by converting large tracts of land into solar farms. These large installations make a major negative environmental impact on the land they occupy. In addition, large installations require the energy they generate to be transported to the cities where it is needed via new transmission lines. These new transmission lines are costly and have a further negative impact on the environment.

What is needed is a means to collect large amounts of solar energy in cities where the energy is used in a manner that improves and beautifies the local environment and has positive environmental externalities.

A second unsolved problem in the areas of the world which have intense sunshine is that many public and private open spaces are underutilized because the sun makes it uncomfortable for people to use those spaces during much of the year. It is too expensive to provide large amounts of shade for those areas. Additionally, many of the plants native to those areas would thrive in the shade if it could be provided.

What is needed is a cost effective means to provide shade for large public and private open spaces to make the spaces more comfortable for people to use. Furthermore, the shade should be provided in a manner that allows plants to flourish.

A third unsolved problem is that the large parking lots in cities with intense sunshine absorb large amounts of heat from the sun and then later reemit that heat. This absorbing and reemitting of heat is known as the heat island effect and makes the cities hotter during the day and hotter longer into the evening. Examples are large asphalt or concrete parking lots such as are typically found near shopping centers and large business areas.

What is needed is a cost effective means to reduce the heat absorbed by the large asphalt parking lots from the sun and thereby reduce the heat island effect in cities with intense sunshine.

A fourth unsolved problem is a way to minimize the area required to collect solar energy. Typically, once solar is installed on a tract of land the land can not be used for anything else or has only limited uses. The land is generally fully occupied by being a solar collection facility. Further when the solar panels are placed near the ground, access roads and paths must be created consuming additional land area. Also, the placement of inverters and other necessary equipment such as transmission lines takes up even more land. Finally the solar panels generally need to be set back away from nearby tall objects such as trees, fences or buildings on adjacent land in order to function efficiently.

What is needed is a means to minimize the amount of land required to collect solar energy and further what is needed is a means to allow the land dedicated to collecting solar energy to be simultaneously used for other purposes.

A fifth unsolved problem is the cost of solar energy. Simply put solar energy costs much more to produce than tradition methods of generating electricity. Thus, a means is needed to reduce or offset the cost of solar energy produced.

SUMMARY OF THE INVENTION

In an exemplary embodiment, a method of generating revenue with a solar structure is provided. This revenue may likely come from three or more sources, including for example, solar panel revenue, shade revenue, and structure revenue. The method includes providing a solar structure comprising a plurality of solar panels. The electricity generated from the solar panels may be sold to produce revenue. Advertising may also be affixed to the solar structure. Revenue may be collected by the solar structure owner from a business for affixing advertising provided by that business. Antennas may also be affixed to the solar structure. Revenue may be collected for affixing the antennas from owners of radio stations, cell phone companies and the like. Further, electric car charging stations may be provided beneath the solar structure. Revenue may be collected from electric car owners for use of the charging station and for power consumed. Revenue may also be generated from fees charged for using the shaded space provided by the solar structure, and from fees charged for parking in the shaded space provided by the solar structure. Donations may also be collected to offset the cost of the solar panels and/or the cost of construction of the solar structure. The names of donors may be displayed.

In an embodiment, the solar structure may be configured with electronic displays such as, for example, televisions or interactive kiosks. These displays may be configured to display information and/or advertising. In an embodiment, the displays may be interactive.

In an embodiment, a method for maintaining a solar structure is provided. The solar structure may have a height of at least 18 feet, a top side facing the sun and an opposing bottom side. The solar structure may comprise a plurality of solar panels. The solar panels may be installed on the top side at an angle between approximately 5 degrees and approximately 15 degrees, and may be accessible from the bottom of the solar structure. To maintain the structure, a user may access a retaining mechanism from the bottom side of the solar structure. The retaining mechanism may be configured to attach the solar panel to the solar structure. The solar panel may be disconnected from the structure by disconnecting the retaining mechanism. The solar panel may then be rotated, such that the solar panel passes from the top side to the bottom side. As noted above and as discussed in detail below the solar panels may be installed at varying angles. In an embodiment, the solar panels are installed on the top side at approximately 8 degrees. Moreover, the solar panels may be arranged in any suitable fashion. As such, in various embodiments, the solar panels are arranged to produce between approximately 10 kwh/ft$^2$ and approximately 15 kwh/ft$^2$.

In an exemplary embodiment, a solar panel system comprises a structure installed over a public area. The public area may include for example, a parking lot, a walkway or mall, a public sitting area, a public court yard, an open air market, and/or the like. The structure may be configured to support and retain a plurality of solar panels. The plurality of solar panels may be spaced apart, such that natural light is permitted to pass through the structure. As such, trees and other vegetation may be located under the structure. This height may also allow for a plurality of security cameras to be installed on the structure. The security cameras may be installed at a height of at least 18 feet above the ground and unobstructed by the structure.

The structure may be supported by one or more vertical supports that are at least 20 feet tall. As such, the structure may be elevated such that the solar panels are subjected to a cooling airflow. The structure may also be configured to display advertisements.

In an exemplary embodiment, a solar panel system may comprise a center structure, a side structure and a corner structure. The center structure may have generally rectangular shape having a first length. The side structure may have a generally rectangular shape having a second length and a second width. The side structure may be coupled to the center structure in a cantilevered configuration, wherein the first length of the center structure corresponds to the second length of the side structure. The corner structure may have a generally rectangular shape having a third length and a third width. The corner structure may be coupled to the side structure in a cantilevered configuration, wherein the second width of the side structure corresponds to the third width of the corner structure.

In an exemplary embodiment, the solar panel system may further comprise a plurality of solar panels that are adjustably attached to the center structure. The solar panel system may also comprise a plurality of shade panels, wherein the shade panels are adjustably attached to the center structure. The system may comprise one or more support structures, which is fixedly attached to the corners of the center structure. The support structures may be at least 18 feet tall.

The plurality of solar panels may be uniformly or non-uniformly distributed across the center structure. The non-uniform arrangement may be configured such that light passing through the center structure provides a desired lighting profile. The desired lighting profile may be an approximation of a shade profile of a natural element.

In an exemplary method for designing a solar structure, a photograph is taken to capture the shade profile of a natural element. The photograph my be pixilated and adjusted based on a set of predetermined factors to achieve a design plan. Based on that design plan, a plurality of solar panels may be arranged corresponding to the design plan to approximate the shade profile of the natural element. In an exemplary embodiment, the plurality of solar panels may be installed on a structure in accordance with the design plan in a public area. In accordance with an exemplary method, the predetermined factors may include lifting force load, shearing force load, lighting requirements, and weight requirements.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and where:

FIG. 6A-FIG. 6D illustrate an exemplary method of creating the spacing of the shade panels from a pattern yielded from the process of pixilation of photographs of the shade profile of a tree;

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments, without departing from the scope of the appended claims. For example, the steps recited in any of the method or process descriptions may be executed in any order and are not necessarily limited to the order presented. Moreover, many of the manufacturing functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. As used herein, the terms "coupled," "coupling," or any other variation thereof, are intended to cover a physical connection, an electrical connection, a magnetic connection, an optical connection, a communicative connection, a functional connection, and/or any other connection.

For the sake of brevity, conventional techniques for mechanical system construction, management, operation, measurement, optimization, and/or control, as well as conventional techniques for mechanical power transfer, modulation, control, and/or use, may not be described in detail herein. Furthermore, the connecting lines shown in various figures contained herein are intended to represent exemplary functional relationships and/or physical couplings between various elements. It should be noted that many alternative or additional functional relationships or physical connections may be present in a modular structure.

In an exemplary embodiment, a modular structure comprises minimal structural support components and is capable of supporting a wide variety of solar energy collection panels above the ground. The structure may comprise a center structure module attached to one or more additional structure modules. The structure may be installed in public or private areas including, for example, parking lots, parks, walkways, driving lanes, playgrounds, outdoor markets, sport viewing areas, performing arts areas, and other public or private areas. Moreover, these structures may be configured to be at least 18 feet tall. The structures may also be configured to allow dappled light to hit the ground, which may provide direct sunlight for vegetation and other features located under the structures.

In an exemplary embodiment and with reference to FIG. 1, a modular structure 100 comprises a solar panel holding structure 110 (hereinafter "SPHS 110") and one or more vertical supports 120. In an embodiment, SPHS 110 is mounted to and supported by one or more vertical supports 120. Modular structure 100 may further comprise one or more solar collection panels 130 and one or more shade panels 140. In an embodiment, one or more solar collection panels 130 are installed in SPHS 110. Similarly, one or more shade panels 140 may be installed in SPHS 110.

In an exemplary embodiment, vertical support 120 may be any structure suitable for supporting a shade structure and/or solar panels. In an embodiment, vertical support 120 is taller than a conventional vertical support for a shade structure. For example, in one embodiment, vertical support 120 may be approximately 18 feet to approximately 30 feet tall. In another embodiment, vertical support 120 may be approximately 22 feet to approximately 30 feet tall. In yet another embodiment, vertical support 120 may be approximately 25 feet to approximately 30 feet tall. In still another embodiment, vertical support 120 is approximately 25 feet tall. The increased height of vertical support 120 provides greater visibility. For example, the increased height of vertical support 120 allows for security cameras to be placed beneath the SPHS 110. This configuration allows security cameras to effectively monitor, while being positioned high enough from public spaces to avoid, vandalism, tampering, or an adverse impact on the environment. The increased height of vertical support also provides other advantages. For example, the increased height positions solar collection panels 130 further away from the ground which results in an increase in cooling airflow. This cooling airflow causes solar collection panels 130 to operate more efficiently by maintaining a cooler operating temperature. Also, the increased height reduces the likelihood of adjacent objects of structures shading the solar panels.

In another embodiment, the increased height of vertical support 120 facilitates planting trees, vegetation, and placing structures underneath modular structure 100. For example, large trees and other types of vegetation that are less than 18 feet tall may be included under the structure. These trees and/or vegetation may be strategically placed under modular structure 100 so that they receive sunlight that is allowed to pass through modular structure 100. Moreover, the ability to include trees and vegetation provides cooling and environmental ambiance not possible to obtain if the structure does not permit such vegetation due to its low clearance.

In an exemplary embodiment, solar collection panel 130 is any device or apparatus configured to receive sunlight and generate electricity. Moreover, solar collection panel 130 may also provide shade. In one embodiment, solar collection panel 130 is a photovoltaic solar panel. Solar collection panel 130 may be of any suitable size, including for example, a 4 foot by 8 foot panel.

In an exemplary embodiment, shade panel 140 may be any device or apparatus configured to provide shade. Shade panel 140 may be made of any suitable material, including for example, a textile, wood, metal, plastic, or any other suitable material capable of providing shade. In one embodiment, shade panel 140 may be an artistic element. Shade panel 140 may be opaque or translucent. Shade panel 140 may also comprise one or more colors. Shade panel 140 may also include a design element. This design element may be visible from above or below modular structure 100. Moreover, in an exemplary embodiment, the design elements are arranged to create visual creative works, messages, and/or art. In an embodiment, shade panel 140 may be the same size or half the size of solar collection panel 130. Shade panel 140 may also be proportionally sized such that it may be installed with SPHS 110 with solar panels 130 to provide an aesthetically pleasing appearance. In one embodiment, shade panel 140 may be any suitable size.

Figure 1:
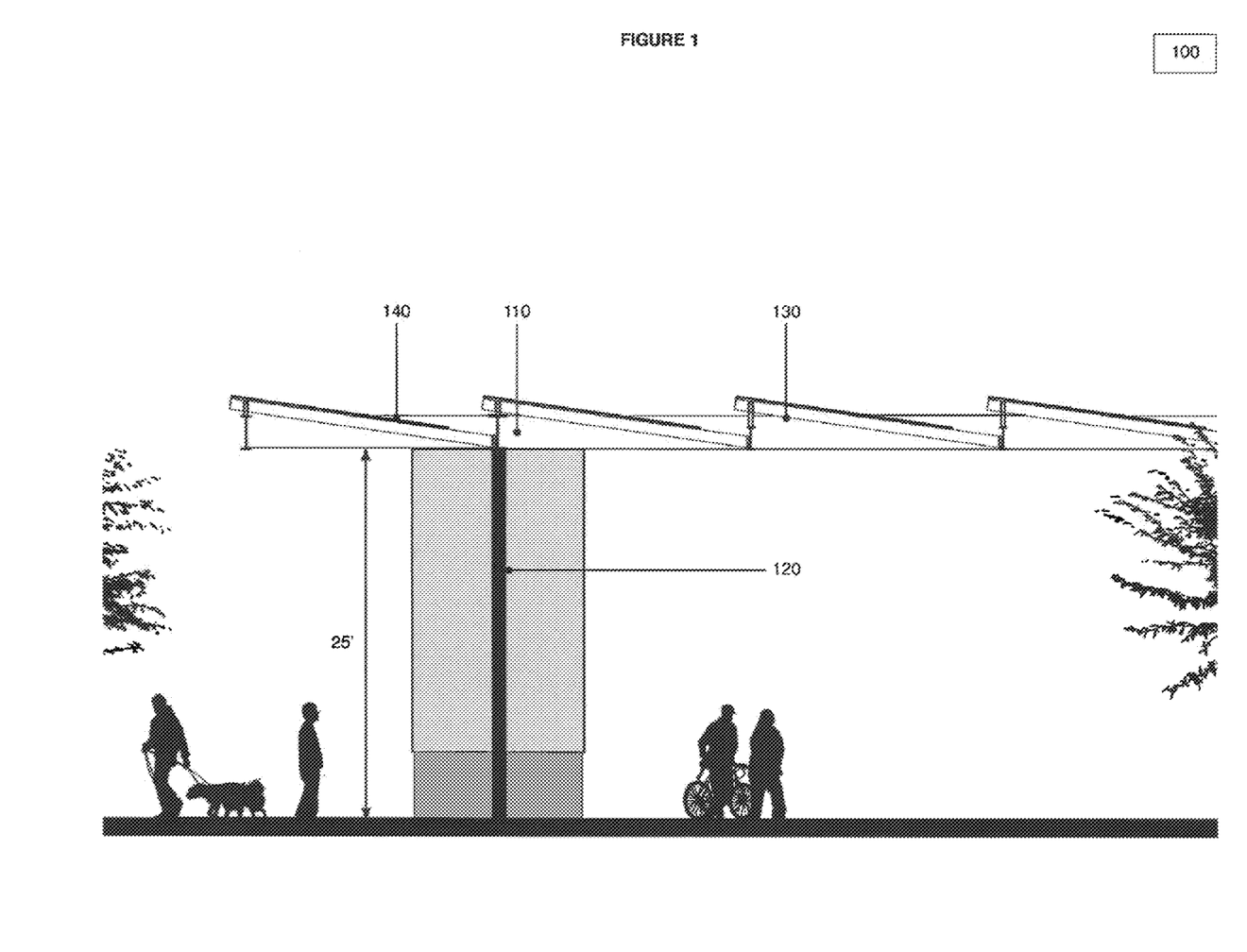
FIG. 1 illustrates an exemplary solar energy collecting shade structure showing people, a car and a tree under the structure.
Figure 2:
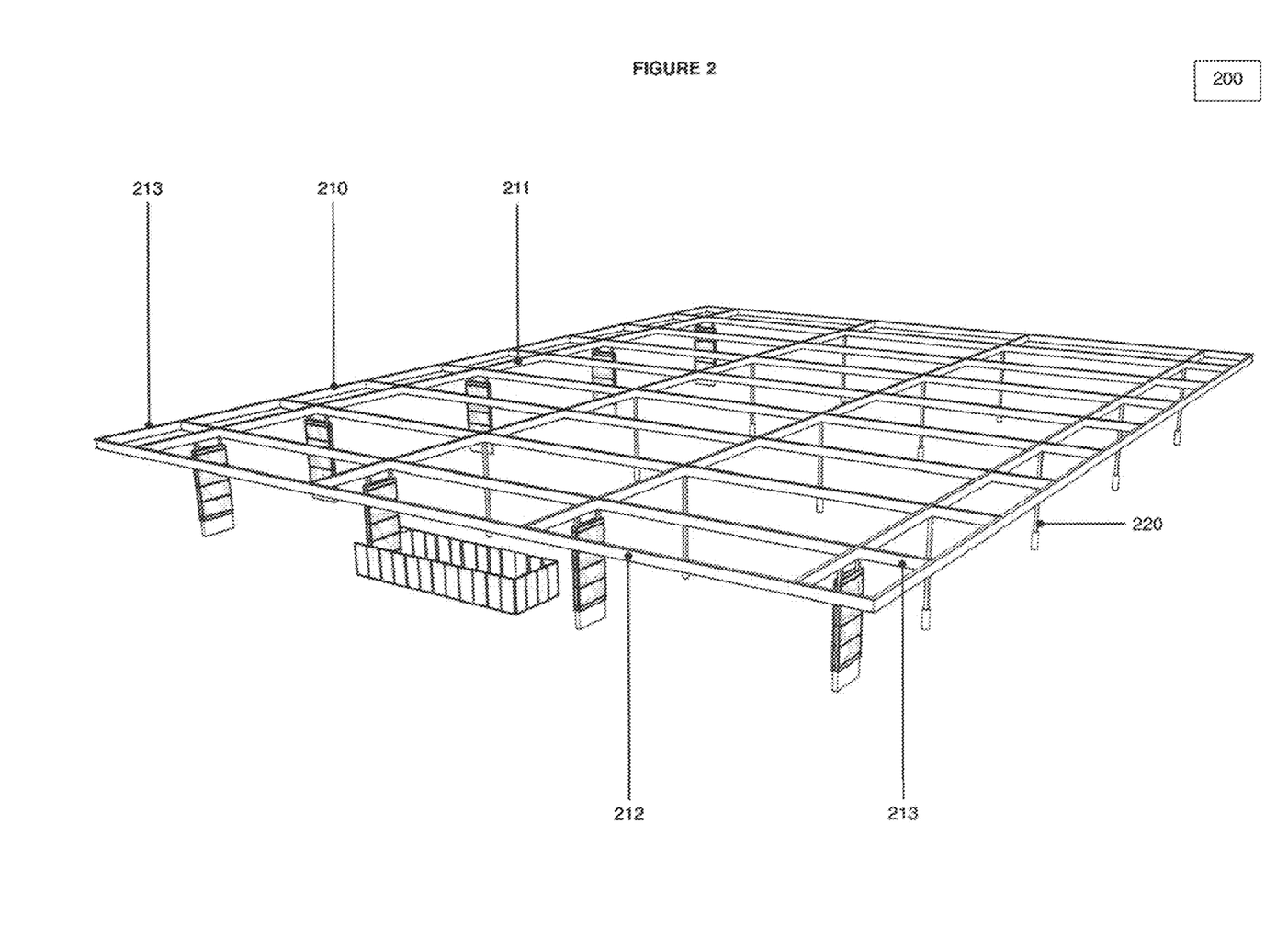
FIG. 2 illustrates an exemplary embodiment of the columns that are attached to the edges of a Center Structure Module.

In an exemplary embodiment and with reference to FIG. 1 and FIG. 2, SPHS 110 is any structure configured to support one or more solar collection panels. SPHS 110 may, in various exemplary embodiments, also support one or more shade panels 140. In various embodiments, SPHS 110 may be modular or may have a unitary design. In one embodiment and with specific reference to FIG. 2, SPHS 210 is modular and may comprise a center section 211. SPHS 110 may further comprise at least one of one or more side sections 212 and one or more corner sections 213. In an embodiment, center section 211, side section 212 and/or corner section 213 may have horizontal structural beams around their edges.

In an embodiment, side section 212 is configured to couple to center section 211. Similarly, corner section 213 may be configured to couple to side section 212 or center section 211. In an embodiment, one or more corner section 213 and/or one or more side section 212 may be coupled to center section 211 in cantilevered arrangements. The cantilevered arrangements provide modular structure 200 with an architectural lightness. Moreover, in various embodiments, one or more side sections 212 and one or more corner sections 213 may be coupled to center section 211 to provide customizable SPHS 210. This allows modular structure 200 to be sized to fit the specific needs of the installation environment, site and context.

In an embodiment, center section 211 may be approximately 64 feet by 64 feet. In various embodiments, center section 211 may be larger than 20 feet by 20 feet but smaller than 64 feet by 64 feet. Moreover, in other embodiments, center section 211 may be larger than 64 feet by 64 feet but smaller than 128 feet by 128 feet. In an embodiment, side module 212 may be approximately 16 feet by 64 feet. In various embodiments, side module 212 may be larger than 8 feet by 20 feet but smaller than 16 feet by 64 feet. In various other embodiments, side structure 212 may be larger than 16 feet by 64 feet but smaller than 32 feet by 128 feet. In an embodiment, corner section 213 may be approximately 16 feet on a side. In various embodiments, corner section 213 may be larger than 8 feet on a side but smaller than 16 feet on a side. In various other embodiments, corner section 213 may be larger than 16 feet on a side but smaller than 32 feet on a side. Moreover, in various embodiments, dimensions of center section 211, side section 212, and corner section 213 vary within a single structure. This allows modular structure 200 to cover any space. For example, in a parking lot installation, modular structure 200 may be laid out on a 64' by 64' grid to provide spacing for a parking lot layout and to minimize the number of columns extending vertically from places other than parking stall lines. Modular structure 200 may also be laid out on a grid matching the dimensions of an existing parking lot layout and to minimize the number of columns extending vertically from places other than parking stall lines.

In an exemplary embodiment, center section 211 may be bisected in one direction by a structural beam from approximately the center of one side to approximately the center of the opposite side of center section 211. The installation of the structural beam may be configured to provide modular structure 200 with additional strength and rigidity under dead load, lift and/or shearing forces.

In another embodiment, modular structure 200 may comprise portions of the structure edged by structural beams. In one embodiment, the entire structure of modular structure 200 may be edged by structural beams. These structural beams may include, for example, I-beams, wide flange beams, square beams, tubes, and/or any other suitable structural beam or structure.

Figure 3:
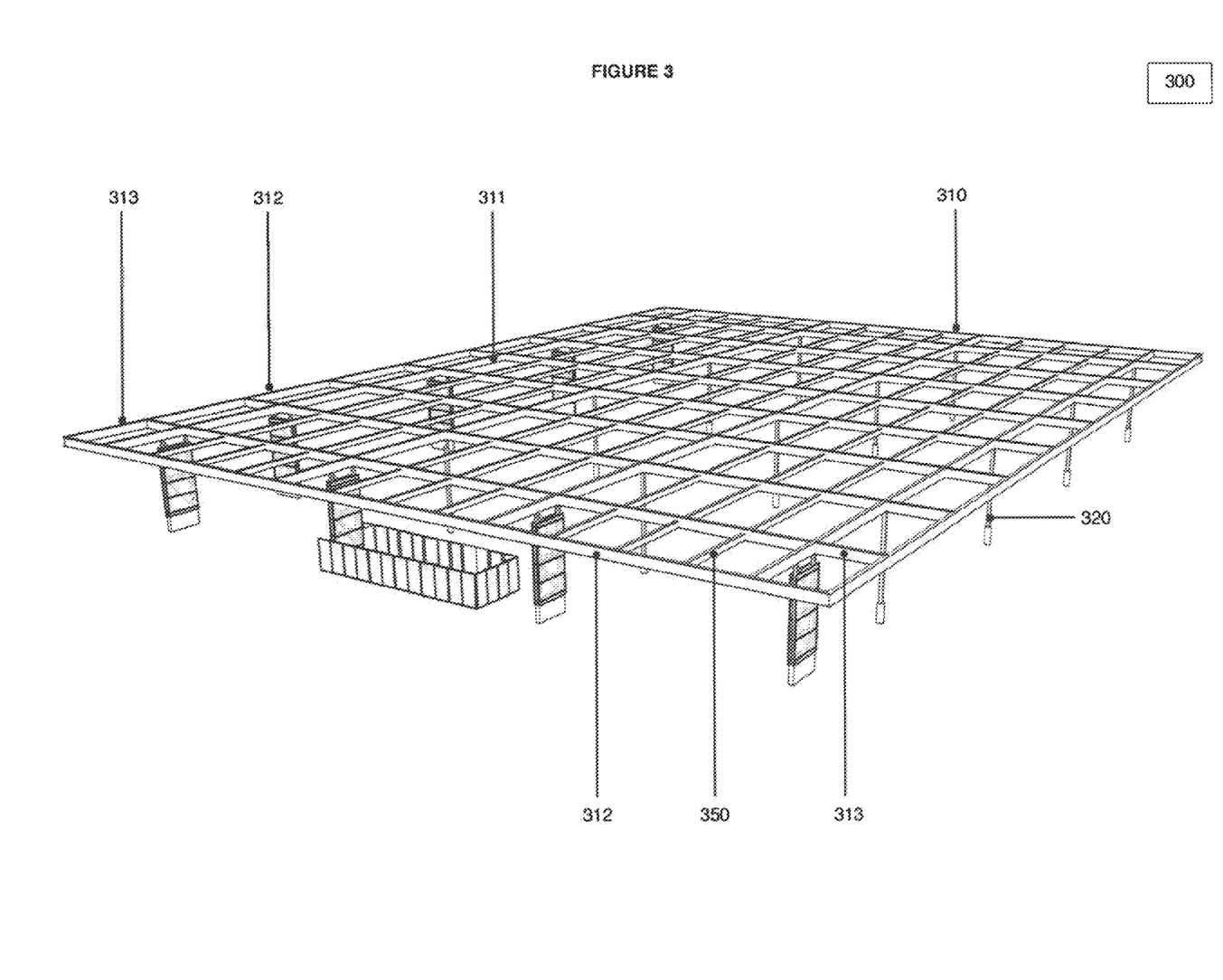
FIG. 3 illustrates an exemplary embodiment of joists in place between structural beams.

In an exemplary embodiment and with reference to FIG. 1 and FIG. 3, modular structure 300 may further comprise one or more panel supports 350. Panel support 350 may be coupled to SPHS 310 in any fashion and in any orientation. In an embodiment, panel support 350 is configured to couple to at least one of center section 311, side section 312 or corner section 313. Panel support 350 may couple to any one of center section 311, side section 312 or corner section 313 in any orientation, such as for example, at a customizable angle. In an embodiment, panel support 350 is configured to couple to and support solar energy collection panel 130. Similarly, panel support 350 may be configured to couple to and support shade panel 140.

In various embodiments and with reference to FIG. 3, FIG. 4A, FIG. 4B, and FIG. 4C, one or more solar collection panels 430 are installed in SPHS 410 at one or more panel supports 350. Solar collection panels 430 may be installed on SPHS 410 in a uniform manner. For example, solar collection panels 430 may be installed at every installation location on panel support 350 in SPHS 410 at a common angle. Similarly, solar collection panels 430 may be installed in a pattern at particular installation locations on panel support 350 in SPHS 410 at a common angle. For example, solar collection panels 430 may be arranged in a particular fashion to display a logo that can be viewed from above the structure.

Figure 4A:
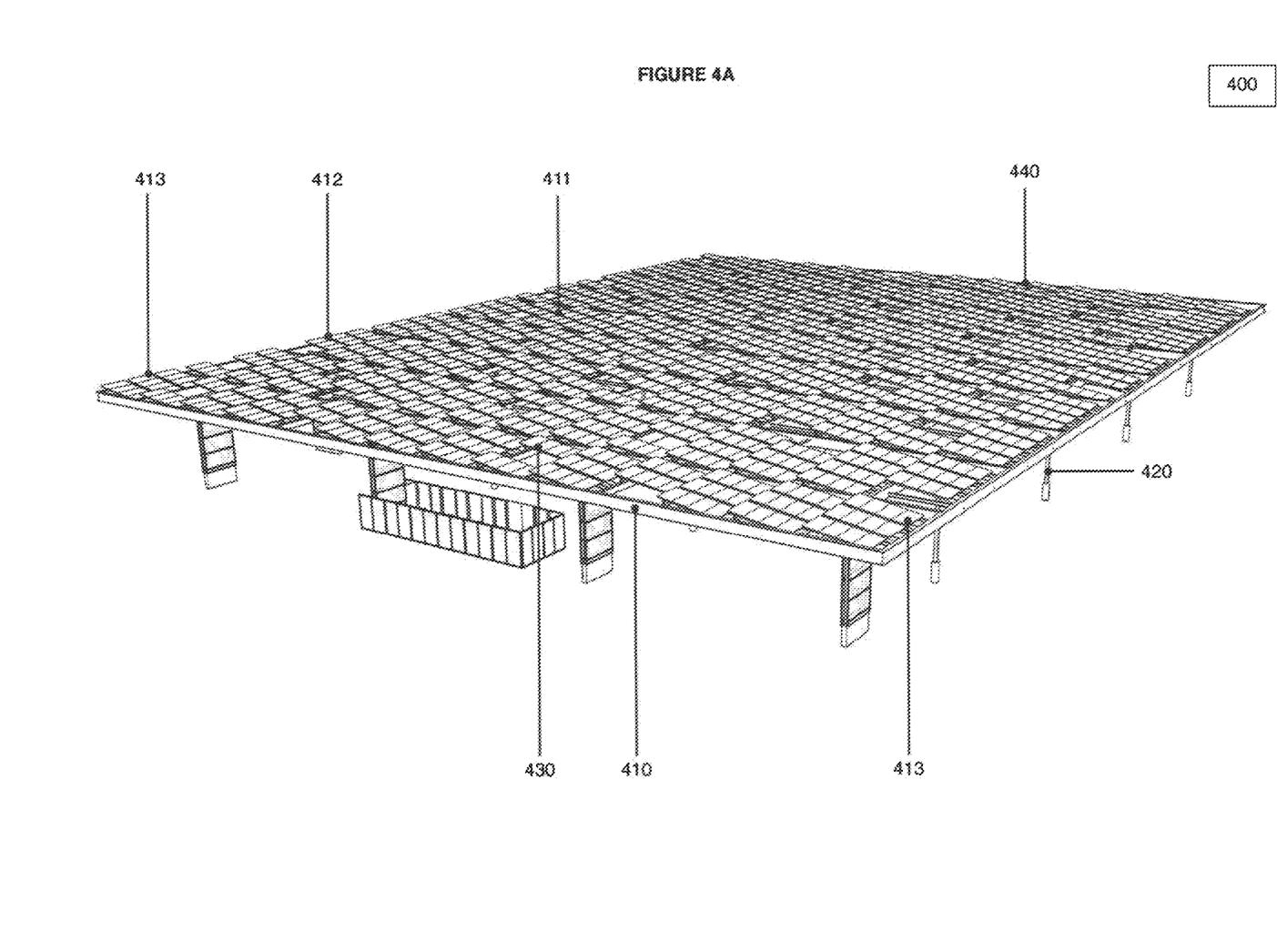
FIG. 4A illustrates a perspective view of an exemplary a modular structure including solar panels arranged to achieve dappling beneath the modular structure.
Figure 4B:
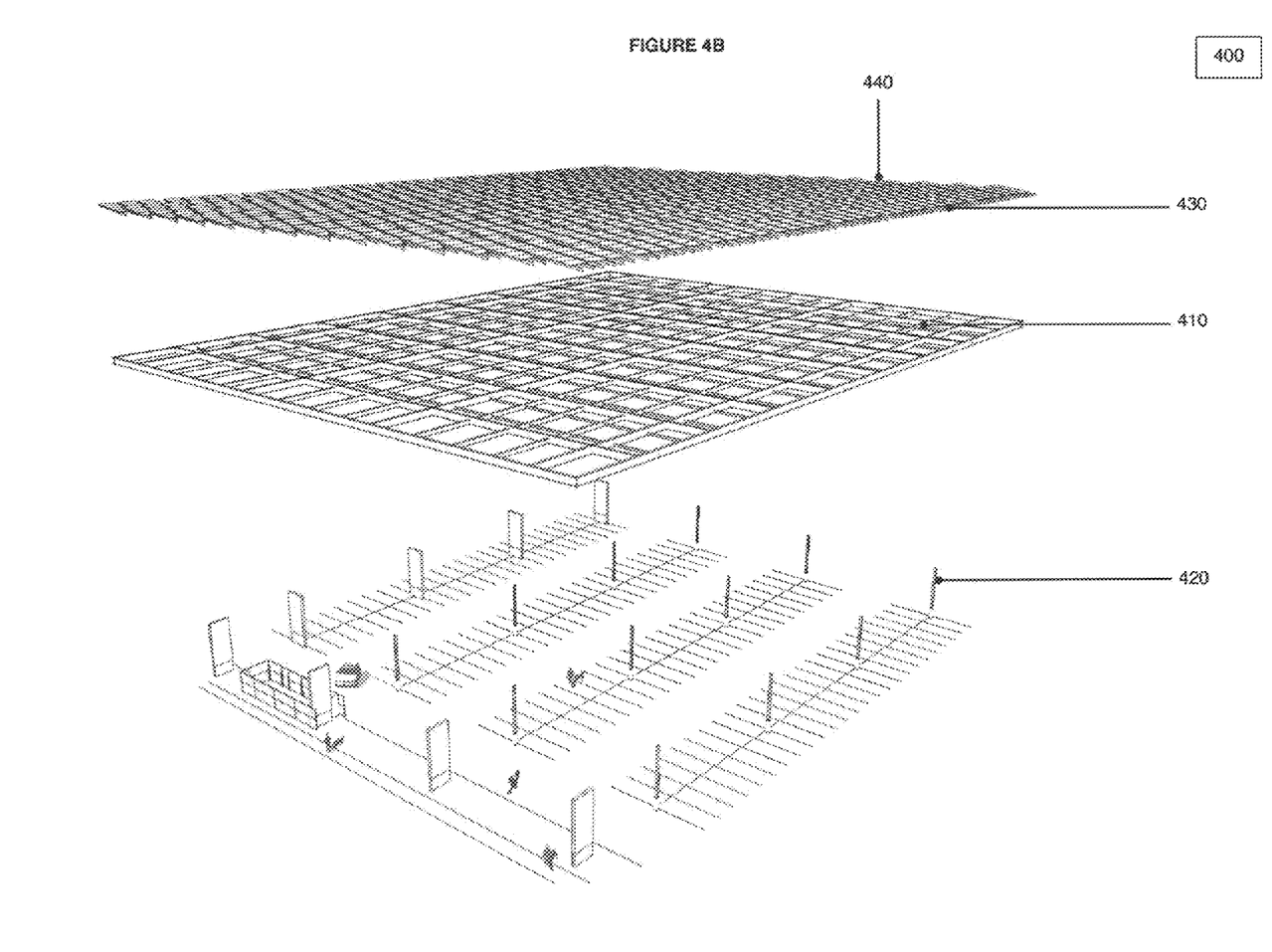
FIG. 4B illustrates an exploded view of an exemplary installation of a modular structure over a parking area.
Figure 4C:
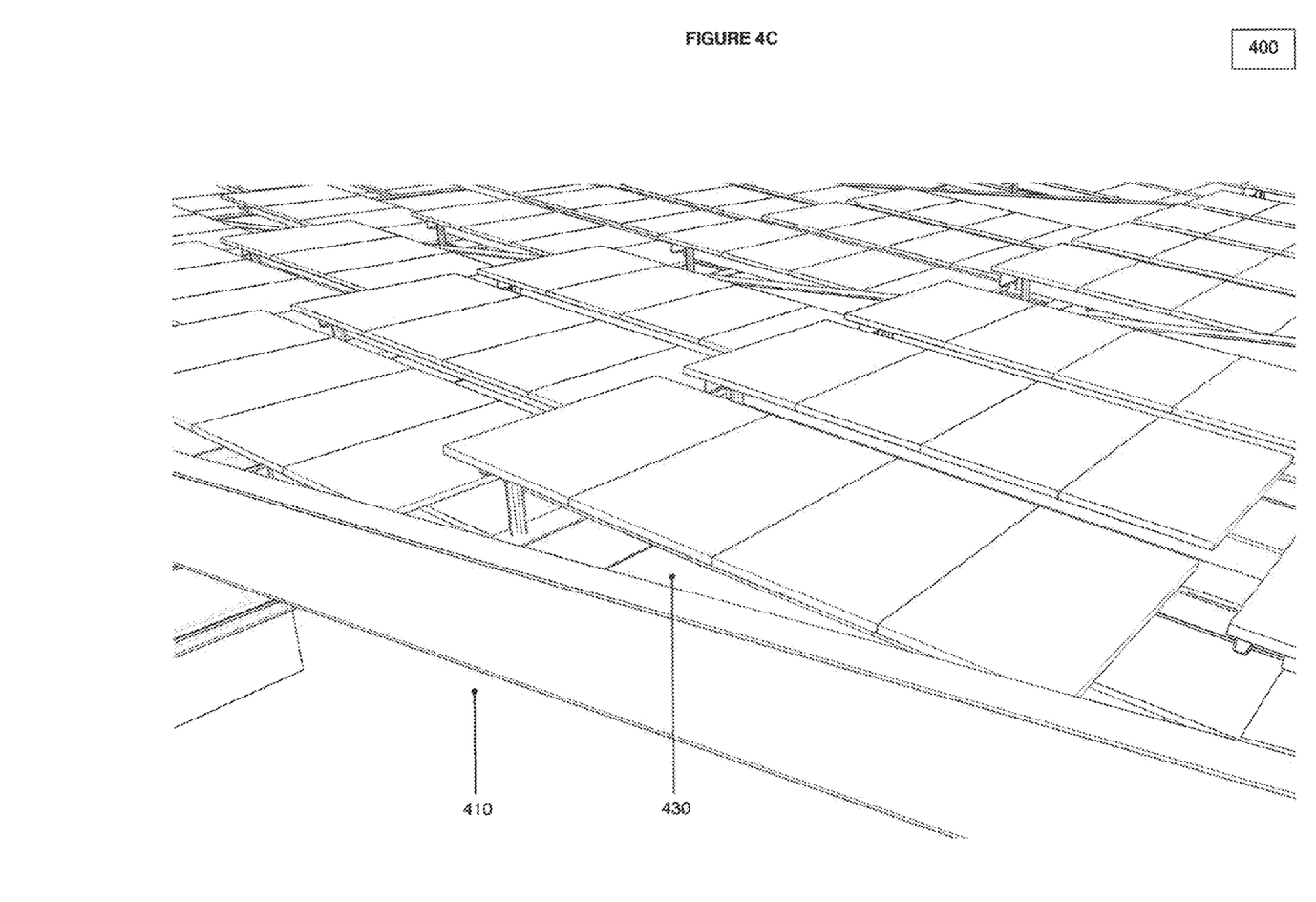
FIG. 4C illustrates an exploded view of an exemplary installation of a modular structure over a parking area.

In another embodiment, solar collection panels 430 may also be installed on SPHS 410 in a non-uniform manner. For example, solar collection panels 430 may be installed at some or all of the available installation locations on panel support 350 in SPHS 410 at different angles and directions. For example, rows of panels may be arranged in opposing directions such that a first group of panels receive sunlight in the morning as the sun rises and a second group of panels receive sunlight in the afternoon and as the sun sets. A third group of panels may be arranged such that they are relatively parallel with the ground so that they receive sun light during mid-day, when the sun is overhead and the intensity of the sunlight is highest. Solar collection panels 430 may be arranged in varying directions and at varying angles in a single structural module. The panels may also be arranged in varying directions and at varying angles by structural module, such that the orientation of a first group of solar collection panels 430 are consistent across of first structural module but are different from the orientation of a second group of solar collection panels 130 across a second structural module.

In another embodiment, solar collection panels 430 may be positioned and tilted in modular structure 400 at such an angle that their full length remains within the height of the edge beams. In various embodiments, solar collection panels 430 may be positioned at varying angles between approximately 5 degrees and 15 degrees. In one embodiment, solar collection panels 430 may be positioned at varying angles between approximately 5 degrees and 10 degrees. In another embodiment, solar collection panels 430 may be positioned at approximately 8 degrees. Solar energy collection panels 430 may also be positioned and tilted in modular structure 300/400 at such an angle that some portion of their length extends beyond the height of the edge beams.

In a typical solar installation in the Northern Hemisphere, solar panels are tilted to the south. As a general rule the optimal angle of panel tilt to the south approximates the latitude of the location. As an example, in the Phoenix, Ariz. area the latitude is about 33° N and solar panels might be tilted at angles approximating 30°. In addition it is important to note that the angle of the sun varies according to the season. As an example, in Phoenix, Ariz. the angle of the sun at noon varies from 32° in winter to 78° in summer. In a typical solar installation panels are spaced south to north so that the panel to the south does not shade its neighboring panel to the north even at the angle of the sun in the winter. However, when considering the design of a solar shade structure, the time the shade is most desired is in the summer. Panels placed at the optimum angle for energy collection and spaced to eliminate shading in winter would allow approximately 75% of the sunlight to reach the ground at noon in the summer.

Moreover, solar shade structures over public or private areas in urban areas need to cover an area determined by the space available. In such installations, solar panels placed at the optimal angle for efficiency per panel do not generate the optimum energy for the structure. As such, in an embodiment, modular structure 400 may comprise solar collection panels placed between approximately 5 degrees and approximately 15 degrees in order to provide adequate shade in the summer. Further, solar collection panels 430 placed at angles between approximately 5 degrees and approximately 10 degrees will allow more rows of solar collection panels 430 and generate more energy than structures with panels placed at steeper angles. As such, solar shade structures in fixed spaces may be best served with panels place at angles of 5° to 10° for two reasons; increased revenue from energy collected and increased shade provided in the summer months.

Moreover, in various embodiments, installation angles between approximately 5 degrees and approximately 15 degrees allow solar collection panels 430 to drain when subjected to rain. This range of angles may also allow panels to be arranged to allow drainage, while achieving a panel density to provide an effective amount of power output in a confined space. Where space is confined, solar collection panels may be installed at angles of less than 28 degrees to achieve more efficient power outputs. For example, where solar panels are installed as described herein, an installation with solar panels installed between approximately 5 degrees and approximately 15 degrees may yield between approximately 10 kwh/ft$^2$ and 15 kwh/ft$^2$. In an embodiment, an installation with solar panels installed at approximately 8 degrees may yield approximately 13.1 kwh/ft$^2$.

In an embodiment, the non-uniform placement of panels may be configured to achieve greater power generation efficiency based on the installation angle of each solar collection panel 430. The ability to install solar collection panels 430 at different directions and angles may increase the power generation efficiency of the structure because the panels may be individually positioned such that they are engaged by sunlight for an optimum time as the sun moves across the sky throughout the day. Panels may also be arranged in particular configurations to capture sunlight that would otherwise be obstructed if the solar collection panels 430 were otherwise installed substantially parallel to the ground.

A non-uniform arrangement of solar collection panels 430 may be desirable for environmental or aesthetic reasons. For example, the non-uniform placement of solar collection panels 430 may be configured to provide a desired lighting effect. To further achieve the desired lighting effect, solar collection panels 430 may not be installed in particular locations to allow light to pass through modular structure 300/400 and reach the ground under modular structure 300/400.

In various embodiments, one or more shade panels 440 may be installed in SPHS 310/410 at one or more panel supports 350. Shade panels 440 may be installed in SPHS 310/410 with solar collection panels 430. Shade panels 440 may be installed on SPHS 310/410 in a uniform manner. Shade panels 430 may also be installed on SPHS 310/410 in a non-uniform manner. This non-uniform arrangement of shade panels 440 may be desirable for environmental or aesthetic reasons. For example, the non-uniform placement of shade panels 440 may be configured to provide a desired lighting effect. Moreover, solar collection panels 430 and shade panels 440 may not be installed at specific installation locations along panel supports 350. The omission of panels at particular location may be desirable to provide direct sunlight to vegetation or features placed under modular structure 300/400.

In another exemplary embodiment and with momentary reference to FIG. 1 and FIG. 4B, solar collection panels 130/430 are attached, removed and serviced from underneath the solar panels. For example, the majority of, or all, panel attachment devices and support mechanisms of solar collection panel 130/430 can be accessed and operated from below the panels. Similarly, solar collection panels 130/430 can be removed from below and replaced with different and/or more efficient panels. Moreover, the supporting connections and circuitry required to use the energy created by solar collection panels 130/430, including for example, an inverter may be located under and shaded by modular structure 100/400. Moreover, the ability to access and service solar collection panels 130/430 facilitates greater panel density where installation space is confined because access from the top of the structure defining the confined space would require access lanes where panels could otherwise be installed. Further, in a ground installation (e.g. a solar farm) the support structure made access from the bottom of the panel impractical. Moreover, because ground installations do not generally have concerns about space, access lanes can easily be included. Thus, in an exemplary embodiment, modular structure 100/400 comprises a supporting structure that does not restrict the ability to remove and install solar collection panels, and/or similarly does not comprise access lanes.

In another exemplary embodiment, modular structure 100/400 comprises one or more sections of the structure configured to either move or rotate up or down or may be removed entirely to allow a person to move through the modular structure 100/400 to clean, service or inspect solar collection panels 130/430 and shade panels 140/440.

In an exemplary embodiment and with reference again to FIG. 3, FIG. 4A, FIG. 4B, and FIG. 4C, solar collection panels 430 and shade panels 440 may be spaced apart when installed along panel support 350. As installed, SPHS 310/410 may be installed at a height of 18 feet or more. As a result, SPHS 310/410 may be subjected to increased air flow from wind. While this airflow does provide cooling, it may also exert forces, including for example, lift forces and shearing forces on SPHS 310/410. As such, solar collection panels 430 and shade panels 440 may be spaced apart. This spacing allows the airflows to pass through SPHS 310/410, which reduces the lift and/or shearing forces exerted on SPHS 310/410.

Figure 5A:
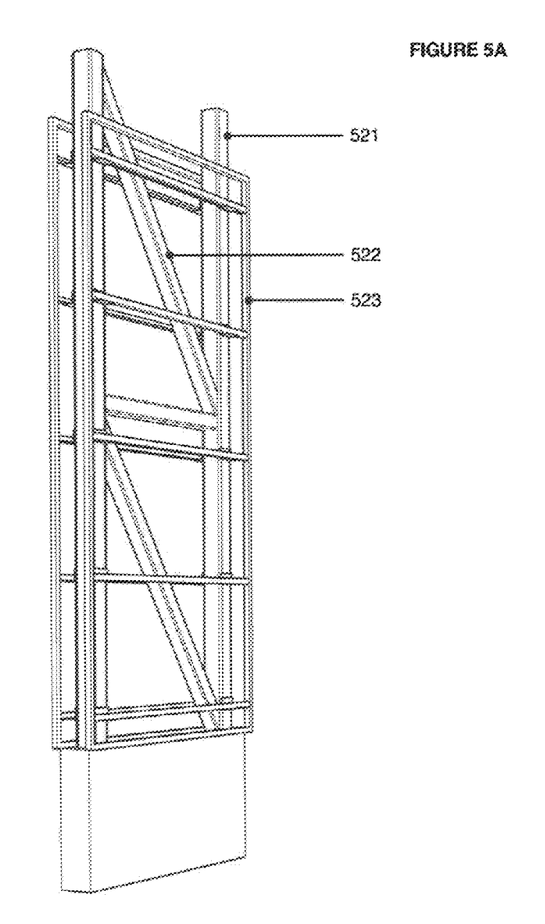
FIG. 5A illustrates a perspective view of an uncladded brace-frame in accordance with an exemplary embodiment.
Figure 5B:
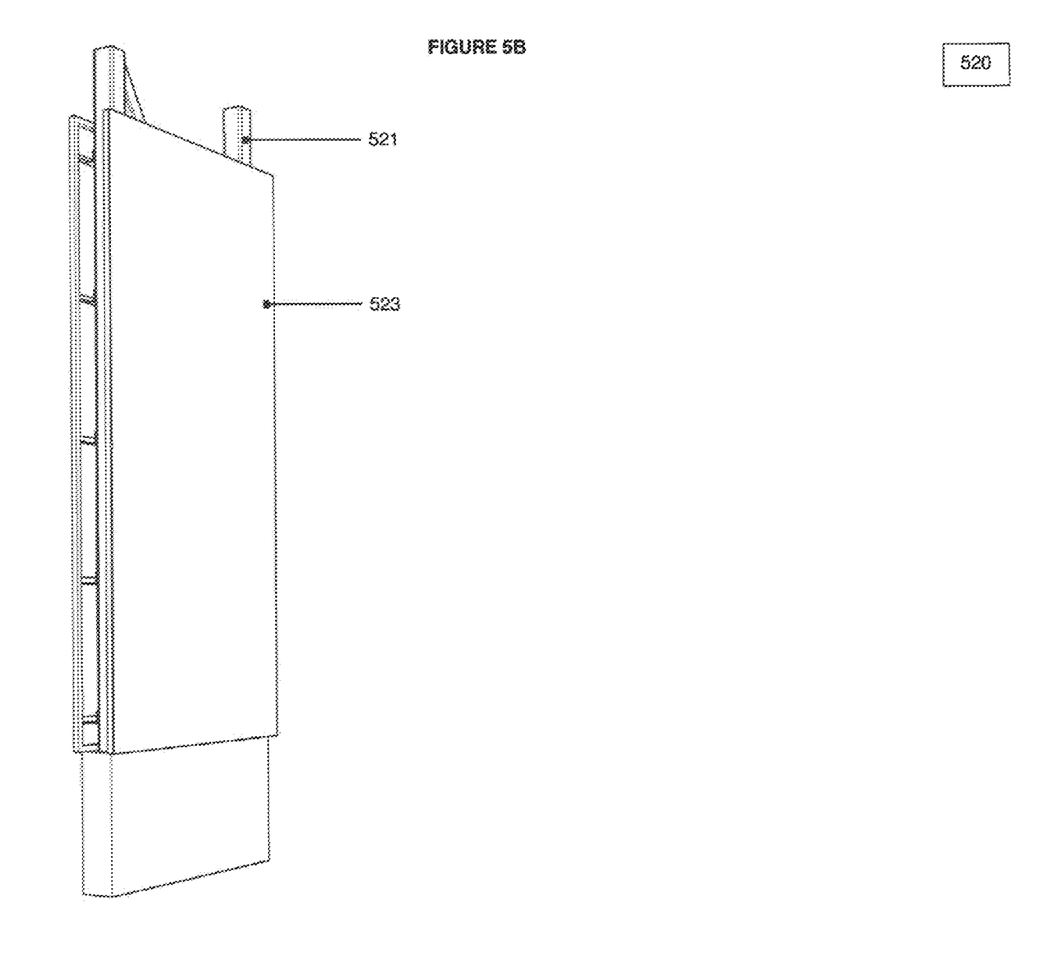
FIG. 5B illustrates a perspective view of an cladded brace-frame in accordance with an exemplary embodiment.

In an embodiment and with reference to FIG. 2, FIG. 5A and FIG. 5B, the vertical support may be configured as a brace frame 520. One or more brace frames 520 may be installed at any locations to support and restrain modular structure 200. In various embodiments, the dead load of modular structure 200 is isolated from the lateral load of modular structure 200. More specifically, as assembled, modular structure 200 has a unitary construction. As such, the lateral forces exerted on modular structure 200 are translated by the structure to every point on the structure. Therefore, these lateral forces may be counteracted at any point on the structure. This configuration reduces the structural requirements of the vertical supports 220/520 by making use of brace-frame 520 to resist the lateral forces of the modular structure 200. In an embodiment, lateral brace-frames are placed in an x and y orientation on every beam line thereby creating lateral stability. For example, center section 311 may be supported above the ground (or other structural surface) by two (2) or more vertical supports 520 and by two (2) or more lateral brace-frames 521. Moreover, brace-frames 520 may comprise a cladding support 522 and cladding 523. Cladding 523 may be used as signage elements to provide decorative graphics and/or advertising space. Brace-frames 520 may be configured with signage elements that include, for example, backlit signs and electronically controlled signs.

Figure 6A:
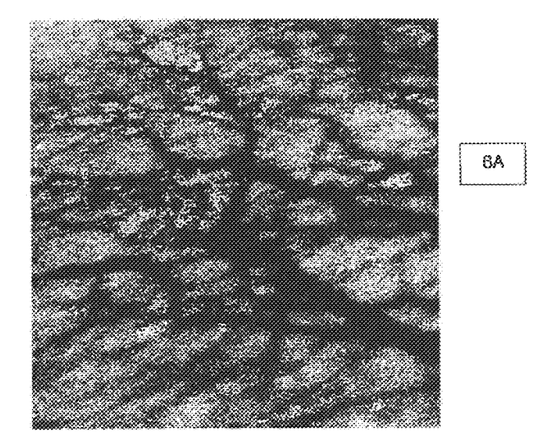
FIG. 6A is a photograph of an exemplary shade profile of a tree branch.
Figure 6B:
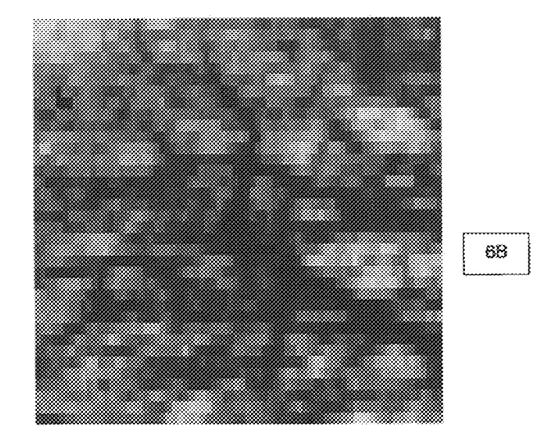
FIG. 6B is an exemplary pixilation of the photograph of the shade profile of a tree branch.
Figure 6C:
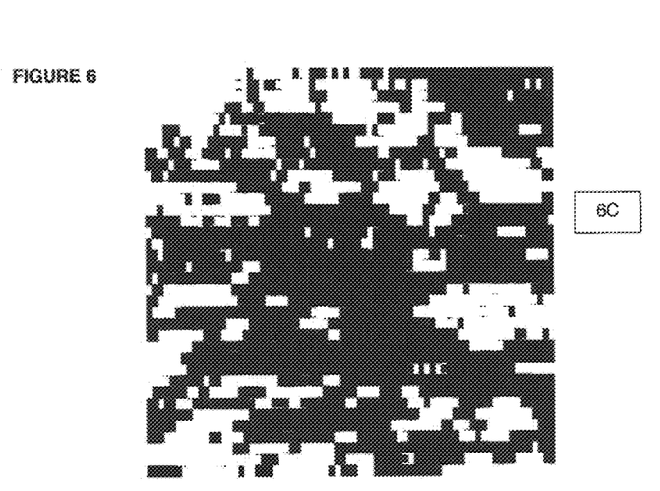
FIG. 6C illustrates an adjustment of the exemplary pixilation of the photograph of the shade profile of a tree branch.
Figure 6D:
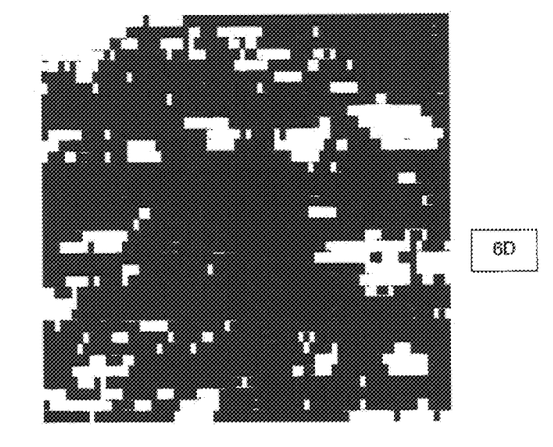
FIG. 6D illustrates a further adjustment of the exemplary pixilation of the photograph of the shade profile of a tree branch corresponding to a design plan for an arrangement of solar panels.

In an exemplary embodiment and with reference to FIG. 4 and FIGS. 6A through 6C, of solar collections panels 430 and shade panels 440 may be arranged to simulate a natural environment. Moreover, FIGS. 6A through 6D show an exemplary process for laying our SPHS 420. For example and with reference to FIG. 6A, the shadow of a tree branch may be photographed. That photograph may be pixilated to create an approximation of the tree shadow. This approximation of the tree shadow can further adjusted, as shown in FIG. 6C and FIG. 6D, to achieve the desired shade coverage and power output. Adjustments may be made based on a variety of factors. For example: (1) solar collection panels 430 may be added to increase the overall power generation of modular structure 400; (2) solar collection panels 430 and shade panels 440 may be removed to decrease the weight of modular structure 400; (3) solar collection panels 430 and shade panels 440 may be removed to decrease the effect of lift or shearing force on modular structure 400; (4) solar collection panels 430 and shade panels 440 may be removed to increase the amount of light that reaches vegetation or structures under modular structure 400; and/or (5) solar collection panels 430 and shade panels 440 may be added or removed to achieve a desired lighting effect (e.g. dappling or stippling of light) under modular structure 400. Although the dappling pattern may be based off of a photograph, any suitable method of arriving at the pattern of solar panels and/or shade panels can be used.

Figure 7A:
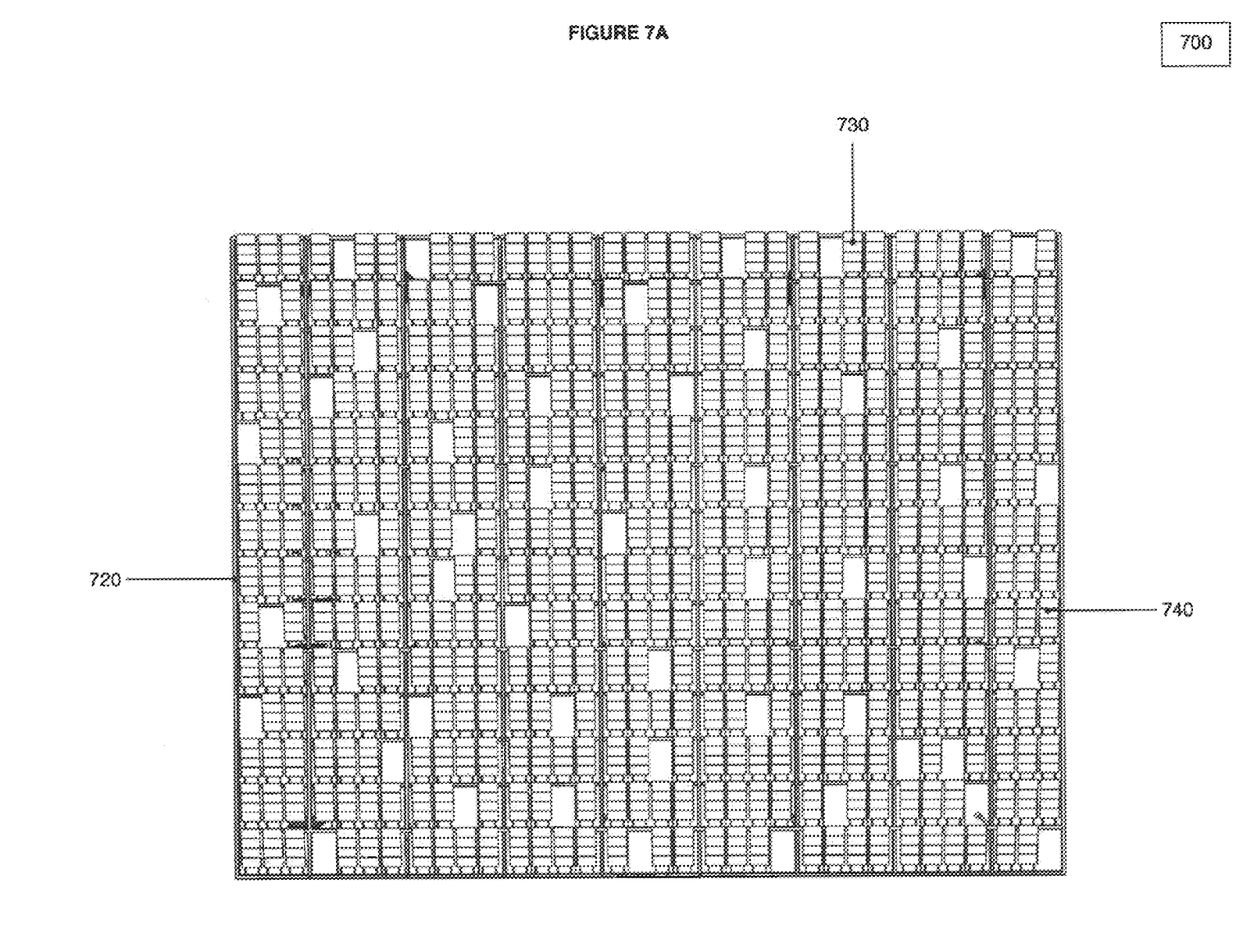
FIG. 7A illustrates a top view of an exemplary modular structure loaded with solar panels in accordance with the design plan.
Figure 7B:
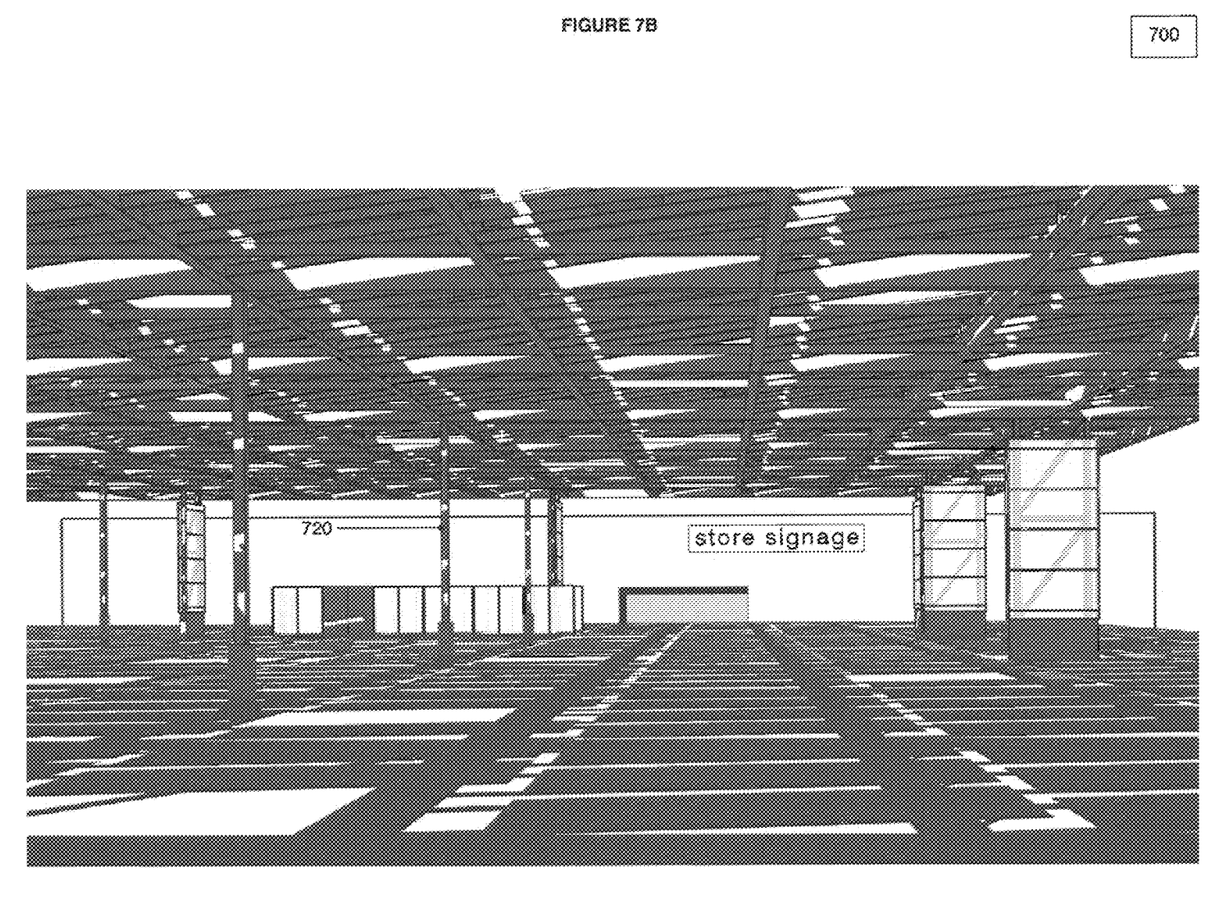
FIG. 7B illustrates a perspective bottom view of an exemplary modular structure loaded with solar panels in accordance with the design plan to provide dappled light and installed in front of a store front.

In an embodiment and with reference to FIG. 7A and FIG. 7B, solar collection panels 730 and shade panels 740 may be arranged in any suitable way to achieve a desired environmental effect. Similarly, the spacing between panels in SPHS 720, the ability to achieve customizable lighting arrangements, and the increased height of modular structure 700 provide a more pleasing experience for a user under the structure.

In an embodiment, the increased height of vertical support 720 also provides greater visibility underneath the shade structure. For example, where modular structure 700 is installed over a parking lot in front of a store, the user of the parking lot is able to see the store front from beneath the modular structure 700. Conventional shade structures over parking lots are generally low enough that they at least partially obstruct the view of the store front from the parking lot. This visibility of the store front is useful in advertising and/or promoting the store. This visibility is also useful for the consumer to maintain their bearings and/or find the store the consumer is looking for. In an exemplary embodiment, the enhanced visibility, the openness of the space underneath modular structure 700, and/or the security cameras provide an environment of enhanced safety for the people under the structure. These features are also more likely to have a deterrent effect on theft, assault, vandalism, and other crime or mischief.

In an embodiment, installation of modular structure 100 may be used to generate revenue and offset the cost of producing solar energy. For example, signage may be attached to modular structure 100 in various locations. Signage may include advertising, information signs, and the like. Signage may be electronic media or printed in any fashion. In the form of advertising, revenue from the signage may be used to reduce or offset the cost of solar energy produced. In an embodiment, modular structure 100 is configured to provide shade. This shade may also be used to offset or reduce the cost of solar energy produced. For example, where modular structure 100 is installed over a parking lot, the parking lot owner may charge a fee to park in a shaded space. At least a portion of the revenue generated by the parking fees may be used to offset the cost of the solar energy produced. In an embodiment, modular structure 100 may be installed at a location as a result of donations. For example, modular structure 100 may be installed on a school campus, museum, zoo or similar location. Supports of the location or associated organization may be given the opportunity to buy solar panels or donate toward the cost of solar panels or modular structure 100 construction. At least a portion of the revenue from the donations may be used to offset the cost of the solar energy produced. Given the height and size of the structure, revenue may also be generated by allowing antennas to be installed on the structure, by charging fees for using the space under the structure, by charging fees for locating electric car charging stations under the structure and/or the like. At least a portion of the revenue may be used to offset the cost of generating solar energy.

In an embodiment, a method of designing a solar structure may comprise capturing a shade profile of a natural element as a photograph; pixilating the photograph; adjusting a contrast ratio of the pixilated photograph based on a set of predetermined factors to achieve a design plan; and designing an arrangement of a plurality of solar collection panels to correspond to the design plan. In one embodiment, the plurality of solar collection panels may be installed on a structure in accordance with the design plan in a public area. In an embodiment, the predetermined factors include at least one of lifting force load, shearing force load, desired lighting effects, and weight requirements.

While the principles of this disclosure have been shown in various embodiments, many modifications of structure, arrangements, proportions, elements, materials and components (which are particularly adapted for a specific environment and operating requirements) may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments.

However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

When language similar to "at least one of A, B, or C" or "at least one of A, B, and C" is used in the claims or specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

The invention claimed is:
1. A solar energy shade structure, comprising:
a solar panel holding structure configured to support and retain a plurality of solar panels, wherein the solar panel holding structure is a planar structure, and wherein individual solar panels, of the plurality of solar panels, are attached to the solar panel holding structure at an angle inclined relative to the planar structure;
a plurality of vertical supports, wherein the plurality of vertical supports are configured to hold the solar panel holding structure above a surface; and
a retaining mechanism configured to attach a solar panel of the plurality of solar panels to the solar panel holding structure, wherein the retaining mechanism is accessible from underneath the solar panel for attaching and detaching solar panels, from the solar panel holding structure, from beneath the solar panel, and wherein the solar panel holding structure comprises openings through which the solar panel can be passed when installing or removing the solar panel, the solar panel being rotatable such that the solar panel can be passed through the openings between a top side of the solar panel holding structure and a bottom side of the solar panel holding structure when installing or removing the solar panel;
wherein the majority of the plurality of solar panels are attached to the solar panel holding structure at an angle that is inclined relative to level, and wherein the solar energy shade structure is configured such that natural light is permitted to pass through the solar panel holding structure.

2. The solar energy shade structure of claim 1, wherein at least one of the plurality of solar panels is tilted relative to the solar panel holding structure at a different angle from another of the plurality of solar panels.

3. The solar energy shade structure of claim 1, wherein at least some of the plurality of vertical supports are at least 18 feet in length, and wherein the majority of the plurality of solar panels are attached to the solar panel holding structure at an angle that is inclined relative to level at an angle between 5 degrees and 15 degrees.

4. The solar energy shade structure of claim 1, wherein the plurality of vertical supports comprise a first force lateral brace-frame, a second force lateral brace-frame separate from the first force lateral brace-frame, and at least two additional columns, wherein the first force lateral brace-frame is oriented with its widest direction perpendicular to the widest direction of the second force lateral brace-frame to create lateral stability.

5. The solar energy shade structure of claim 1, wherein the solar panel holding structure is configured to be able to hold a maximum number X of solar panels, and wherein less than X solar panels are installed.

6. The solar energy shade structure of claim 5, wherein shade panels are installed in the place of solar panels in some locations.

7. The solar energy shade structure of claim 5, wherein solar panels are omitted from the solar panel holding structure to allow sunlight through places where solar panels could have been installed.

8. The solar energy shade structure of claim 7, wherein solar panels are omitted in a manner to create a dappled light shade effect under the solar energy shade structure.

9. The solar energy shade structure of claim 1, wherein the solar panel holding structure is a contiguous planar structure over more than one area type, wherein the area types comprise: parking spots, driveways between parking spots, aisles, walkways, and public gathering areas.

10. The solar energy shade structure of claim 1, wherein at least some of the plurality of vertical supports are at least 25 feet in length.

11. A solar panel system comprising:
a planar solar panel support structure, the planar solar panel support structure being at least 64 feet long by 64 feet wide;
a plurality of vertical supports of at least 18 feet in length, the plurality of vertical supports for supporting the planar solar panel support structure above a surface;
a plurality of solar panels, the planar solar panel support structure supporting each of the plurality of solar panels, wherein most of the plurality of solar panels are inclined relative to the planar solar panel support structure at an angle of between 5 degrees and 15 degrees relative to level, and wherein most of the plurality of solar panels are located in a two dimensional array of possible places where solar panels can be placed, wherein the planar solar panel support structure and the plurality of solar panels are configured to allow direct sunlight to pass through the solar panel system to objects beneath the solar panel system; and
a retaining mechanism configured to attach a solar panel of the plurality of solar panels to the planar solar panel support structure, wherein the retaining mechanism is accessible from underneath the solar panel for attaching and detaching solar panels, from the planar solar panel support structure, from beneath the solar panel, and wherein the planar solar panel support structure comprises openings through which the solar panel can be passed when installing or removing the solar panel, the solar panel being rotatable such that the solar panel can be passed through the openings between a top side of the planar solar panel support structure and a bottom side of the planar solar panel support structure when installing or removing the solar panel.

12. The solar panel system of claim 11, wherein the plurality of solar panels are uniformly distributed across the two dimensional array.

13. The solar panel system of claim 11, wherein the plurality of solar panels are non-uniformly distributed across the two dimensional array.

14. The solar panel system of claim 13, wherein the non-uniform distribution comprises an arrangement of solar panels where some of the solar panels are omitted from some of the available installation locations.

15. The solar panel system of claim 14, wherein the non-uniform distribution provides a dappled shade effect under the solar panel system when subjected to sunlight, and wherein the non-uniform distribution creates a desired lighting profile that is an approximation of a shade profile of a natural element.

16. The solar panel system of claim 11, further comprising a plurality of shade panels, wherein at least one of plurality of shade panels are attached to the planar solar panel support structure in place of one or more of the plurality of solar panels.

17. The solar panel system of claim 11, further comprising:
at least two force lateral brace-frames comprising:
a first force lateral brace frame having a first length, a first width, and a first height, with the first length being wider than the first width to provide lateral stability in a first direction associated with the first length; and
a second force lateral brace frame, separate from the first force lateral brace frame, having a second length, a second width, and a second height, with the second length being wider than the second width to provide lateral stability in a second direction associated with the second length, wherein the first direction is perpendicular to the second direction.

18. The solar panel system of claim 11, wherein the solar panel system is configured for installation over an existing parking lot, and is configured such that the solar panel system, with the exception of the plurality of vertical supports, does not obstruct a pedestrian's view of store front signage when the pedestrian and the store front signage are proximate to the solar panel system.

19. The solar panel system of claim 11, wherein the plurality of solar panels are configured to be installed, removed, and serviced from underneath the planar solar panel support structure.

20. A solar energy shade structure comprising:
a planar solar panel support structure contiguously covering at least two areas of different types, wherein the area types comprise: parking spaces, and driving aisles;
the planar solar panel support structure comprising at least a 64 foot by 64 foot structure, laid out in a contiguous grid over a parking lot;
a plurality of vertical supports connected to the planar solar panel support structure and configured to hold the planar solar panel support structure elevated over a surface;
a plurality of solar panels attached to the planar solar panel support structure, wherein at least a subset of the plurality of solar panels are inclined relative to the planar solar panel support structure; and a retaining mechanism configured to attach a solar panel of the plurality of solar panels to the planar solar panel support structure, wherein the retaining mechanism is accessible from underneath the solar panel for attaching and detaching solar panels, from the planar solar panel support structure, from beneath the solar panel, and wherein the planar solar panel support structure comprises openings through which the solar panel can be passed when installing or removing the solar panel, the solar panel being rotatable such that the solar panel can be passed through the openings between a top side of the planar solar panel support structure and a bottom side of the planar solar panel support structure when installing or removing the solar panel;

wherein the plurality of solar panels are attached to the planar solar panel support structure such that they can be installed, serviced, and removed from below the planar solar panel support structure; and wherein the solar energy shade structure has a high panel density defined in that an arrangement of the plurality of solar panels is uninterrupted by service or access lanes.

21. The solar energy shade structure of claim 20, wherein the planar solar panel support structure comprises a plurality of lateral beams forming a grid with installation locations for one or more of the plurality of solar panels, and wherein the plurality of solar panels are located within openings in the grid at the installation locations such that at least a portion of a solar panel of the plurality of solar panels is below the top of the plurality of lateral beams.

22. The solar energy shade structure of claim 20, wherein the planar solar panel support structure is configured to be held at least 20 feet above the surface.

* * * * *